May 13, 1941.  P. J. BARNES  2,241,759
INK VAPORIZING APPARATUS
Filed Jan. 14, 1938
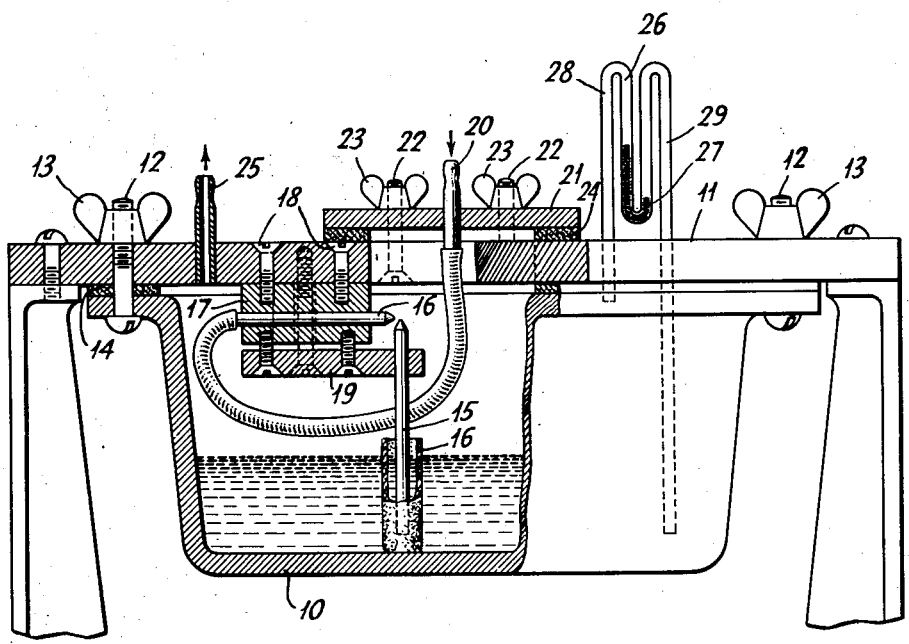
INVENTOR.
PERCY J. BARNES
BY
ATTORNEY.

Patented May 13, 1941

2,241,759

UNITED STATES PATENT OFFICE 2,241,759

INK VAPORIZING APPARATUS

Percy J. Barnes, Babylon, N. Y., assignor to Radio Corporation of America, a corporation of Delaware Application January 14, 1938, Serial No. 185,073

4 Claims. (Cl. 299—88.5)

My invention relates broadly to vaporizing apparatus, and more particularly to a vaporizing apparatus for forming ink vapors.

There are in general four systems of recording used in facsimile transmission and recording. The first of these is that in which a light beam is either keyed or modulated in accordance with facsimile signals and exposes a recording medium as, for instance, well known photographic plates or paper. This system suffers from the disadvantage that the recording must be made in a dark room. Hence, errors in transmission and other items which affect the correct reproduction are not known until the entire plate has been exposed and is then developed and printed.

The second system is the so-called carbon recording method in which a smudge of carbon of elementary cross-sectional area is deposited in accordance with the received facsimile signals. This suffers from the disadvantage that the carbon must be soft in nature, and hence tends to smear after the reproduction has been made.

The third system is the so-called electrolytic method and, at the present time this has not been developed to a state where it is commercially feasible.

The fourth method of recording is the so-called visual ink recording wherein a very fine vapor of ink is deposited onto a recording medium in accordance with receiving facsimile signals. This latter method enjoys the advantage that errors are immediately obvious since the recording is visual, that it is permanent in nature, and that to a great extent it is commercially feasible.

Accordingly, it is one of the objects of my invention to provide an apparatus by means of which ink may be vaporized for use with such devices, and it should be understood of course that its action or its use while particularly adaptable to this type of problem is not restrained thereto.

In vaporizers known in the prior art, there were several outstanding disadvantages. One of these was the fact that it was difficult to continually atomize or vaporize the small volume of ink required to actuate the recording nozzle on a facsimile recorder. Accordingly, it is another of the objects of my invention to provide an apparatus which will desirably and adequately fulfill this need.

Furthermore, in apparatuses of this nature known in the prior art, the atomizer orifices have been fabricated of metal, and accordingly have been subject to corrosive action of the ink dyes. When this corrosive action takes place, it is very difficult, if not impossible, to maintain a standard condition of atomization or vaporization. Accordingly, it is another of the objects of my invention to provide a device in which the atomizing orifices are non-corrosive, and, accordingly, are not affected by the ink dye.

Furthermore, in vaporizers known to the prior art, the ink chamber, per se, has been made of a material which is not inert to ink dye, and the chamber itself has been subjected to the corrosive action of the ink dyes and the consequent fouling of the ink. Accordingly, it is another object of my invention to provide an apparatus in which the ink chamber is made of a material which is inert to ink dye.

In general, my apparatus comprises or consists in providing a chamber which is maintained substantially air-tight composed of a material which is inert to ink dye, and enclosing a system of non-corrosive nozzles for breaking up the ink into a mist of fine particles by means of air passing over the ink at high velocity. The nozzles are supported in general by the cover member of the ink chamber, and the supported members themselves are made relatively adjustable so that the degree of atomization or vaporization may be adjusted at will. In general, the material which has been used for the chamber is a lead-antimony alloy which is heavily chromium plated on the inside, and this is covered by a lid having an inlet aperture and an outlet aperture to accommodate the inlet and outlet nozzles respectively. The cover is fastened to the chamber, and a gasket is interposed between the cover and the chamber for maintaining the arrangement substantially air-tight. In order to determine the height of the ink of the vessel at any particular time, a manometer is provided which may be graduated as desired to indicate in desired terms the amount of ink in the chamber. The ink, before being admitted to the nozzle over which is blown a jet of air, is first filtered by means of a felt or felt-like ink filter.

My invention will best be understood by references to the drawing in which the figure shows one embodiment thereof.

Referring to the drawing, an ink chamber 10 is provided which has been composed of a lead-antimony alloy which is heavily chromium plated on the inner surface thereof, a top or apertured cover member 11 is provided which is joined to the chamber member 10 by means of bolts such as 12 and wing nut 13 through a gasket member 14 which maintains the chamber in a substantially air tight condition. A member 15 which has the ink orifice at the extreme end thereof is shown submerged in the ink but separated therefrom by a filter member 16 which may be of felt or felt-like material. Naturally, I am not limited to the particular filtering material. The end of the nozzle is formed in a constricted manner and has, in general, been drawn to a size of approximately $\tfrac{3}{10}$ mm. This member is formed of glass, and hence is non-corrosive. It will be appreciated of course that other non-corrosive materials, such, for instance, as quartz might readily be substituted for the material of which this member is comprised.

Located immediately adjacent the member 15 is a member 16 through which the air jet is blown, and this member similarly has a constricted end which blows a very fine jet of air over the ink nozzle at an extremely high velocity, thus vaporizing or atomizing the ink. The member 16 also may be formed of glass or other non-corrosive material upon which the ink will not react.

The member 16 is shown as passing through a support member 17 which is fastened to the top cover of the vessel by means of screws 18. Also joined to the support member 17 is a second support member 19 which, for purposes of clarity, has been shown as being slightly separated from the member 17 in spatial relationship. The member 19 may be joined to the member 17 by means of screws fitting into screw threaded apertures, thus making the latter relatively adjustable with respect to the support 17, and thus enabling the operator of the devices to change the degree of atomization at will. The air nozzle forming member 16 is then joined to an air inlet 20 which passes through the cover to the vessel and to which may be joined a coupling member from an air compressor or some source of compressed air in order to blow a jet of air through the air nozzle at a very high velocity.

It will be noted that still a further cover member 21 is joined to the upper cover by means of bolts such as 22 and the wing nut 23. A gasket 24 is interposed between the second cover member and the first cover member for the purpose of retaining a substantially air-tight or air-tight condition of the chamber. The benefit of such an arrangement is that the support members 17 and 19 may be fastened to this upper cover section, and hence may be removed at will for purposes of adjustment and ready accessibility. This has not been shown in the drawing for purposes of clarity, and comprises an alternative arrangement. The vaporized ink as it is formed fills the upper section of the chamber and may be drawn off through the outet vent 25 which passes through the cover to the vessel.

Also passing through the upper cover and down into the ink chamber is one section of a substantially M-shaped manometer 26 which may be graduated in any manner for the convenience of reading the amount of ink actually in the vessel at any time. The manometer has a section filled with a colored liquid 27 with low viscosity, low surface tension, and which is non-volatilable at ordinary temperature as, for instance, a high petroleum oil dyed to render the material more visible. This material is contained in the central loop of the manometer and indicates the ink level in the chamber by means of the difference in pressure in the two outer limbs 28 and 29 due to displacement of air in the longer limb by the ink which forces the indicating liquid up one of the limbs, and the difference in reading can be read off on a scale graduated as desired.

It will be appreciated that there are a number of modifications both in form and in material that might be readily substituted for the materials described herein as, for instance, the nozzle members might be formed of quartz or other material which is non-corrosive in the presence of ink dyes, or the chamber might be made of molded Bakelite or other non-metallic substances.

It will be appreciated that with an arrangement of this nature monitoring may be very easily accomplished at the transmitter, a fact which is not true, for instance, of the photographic type of recording, and the arrangement forms a very simple arrangement for a problem which has in the prior art been most perplexing both from a standpoint of feasibility and serviceability.

What I claim is:

1. An ink atomizer comprising an ink chamber formed of a material inert to ink dye, an apertured cover for said chamber, a first supporting member joined to the apertured cover, a second supporting member mounted on said first supporting member and adjustable with respect thereto, a first tubular member passing through and held by the first supporting member and adapted to have a pressure medium passed therethrough, a second tubular member passing through and supported by the second supporting member, said second tubular member having one end thereof positioned immediately adjacent the end of said first tubular member and the other end thereof adapted to be immersed in ink and outlet means passing through an aperture in said chamber for removing ink vapor of a substantially constant value.

2. An ink atomizer comprising an ink chamber formed of a lead-antimony alloy having a heavy chromium plating on the inner surface of said chamber, an apertured cover for said chamber, a first supporting member joined to the apertured cover, a second supporting member mounted on said first supporting member and adjusting with respect thereto, a first tubular member passing through and held by the first supporting member and adapted to have a pressure medium passed therethrough, and a second tubular member passing through and supported by the second supporting member, said second tubular member having one end thereof positioned immediately adjacent the end of said first tubular member and the other end thereof adapted to be immersed in ink.

3. An ink atomizer comprising a substantially air tight ink chamber formed of a material inert to ink dye, an apertured cover for said chamber, a first supporting member joined to the apertured cover, a second supporting member mounted on said first supporting member and adjustable with respect thereto, a first tubular member passing through and held by the first supporting member and adapted to have a pressure medium of substantially constant value passed therethrough, a second tubular member passing through and supported by the second supporting member, said second tubular member having one end thereof positioned immediately adjacent the end of said first tubular member and the other end thereof adapted to be immersed in ink, an outlet means passing through an aperture in said chamber for removing ink vapor of a substantially constant value and a manometer having the ends thereof passing into said ink chamber.

4. An ink atomizer comprising an ink chamber formed of a lead-antimony alloy having a heavy chromium plating on the inner surface of said chamber, an apertured cover for said chamber, a first supporting member joined to the apertured cover, a second supporting member mounted on said first supporting member and adjustable with respect thereto, a first tubular member passing through and held by the first supporting member and adapted to have a pressure medium passed therethrough, and a second tubular member passing through and supported by the second supporting member, said second tubular member having one end thereof positioned immediately adjacent the end of said first tubular member and the other end thereof adapted to be immersed in ink, and a manometer having the ends passing into said ink chamber.

PERCY J. BARNES.